US011928932B2

(12) United States Patent
Salmon et al.

(10) Patent No.: US 11,928,932 B2
(45) **Date of Patent: *Mar. 12, 2024**

(54) GAMING MACHINE AND METHOD FOR PROGRESSIVE PAY TABLE MODIFICATION OVER A PLURALITY OF GAME ROUNDS TO CONTROL PROBABILITIES FOR WINNING JACKPOTS

(71) Applicant: Aristocrat Technologies Australia Pty Limited, North Ryde (AU)

(72) Inventors: Christian James Salmon, Manly (AU); Kieran Power, Alexandria (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 36 days.

This patent is subject to a terminal disclaimer.

(21) Appl. No.: 17/840,278

(22) Filed: Jun. 14, 2022

(65) Prior Publication Data

US 2022/0309872 A1 Sep. 29, 2022

Related U.S. Application Data

(63) Continuation of application No. 16/883,261, filed on May 26, 2020, now Pat. No. 11,361,623, which is a (Continued)

(30) Foreign Application Priority Data

Jan. 12, 2017 (AU) ................................ 2017900081

(51) Int. Cl.
*G07F 17/32* (2006.01)

(52) U.S. Cl.
CPC ...... *G07F 17/3262* (2013.01); *G07F 17/3213* (2013.01); *G07F 17/3244* (2013.01); *G07F 17/3258* (2013.01); *G07F 17/3288* (2013.01)

(58) Field of Classification Search
CPC ............. G07F 17/3213; G07F 17/3211; G07F 17/3244; G07F 17/3258; G07F 17/3262; G07F 17/3265
(Continued)

(56) References Cited

U.S. PATENT DOCUMENTS

| | | |
|---|---|---|
| 9,412,219 B2 | 8/2016 | Salmon |
| 10,453,312 B1 | 10/2019 | Weaver |

(Continued)

OTHER PUBLICATIONS

Office Action (Non-Final Rejection) dated Dec. 16, 2021 for U.S. Appl. No. 16/883,261 (pp. 1-9).

(Continued)

*Primary Examiner* — Michael A Cuff
(74) *Attorney, Agent, or Firm* — McAndrews, Held & Malloy, Ltd.

(57) ABSTRACT

A gaming machine comprises memory storing a pay table comprising a plurality of pay table items, each item defining a prize and a required winning combination of symbols to achieve the respective prize, a pay table modifier configured to modify the pay table to apply to at least one game outcome by changing the required winning combination of symbols associated with a first prize such that a lower number of symbols are required to achieve the first prize, an outcome generator configured to generate each at least one game outcome by selecting symbols for display in a plurality of columns of symbol display positions on a display of the gaming machine, and an outcome evaluator configured to evaluate the selected symbols based on the modified pay table upon the pay table being modified.

20 Claims, 9 Drawing Sheets

Related U.S. Application Data continuation of application No. 15/870,156, filed on Jan. 12, 2018, now Pat. No. 10,672,230.

(58) Field of Classification Search
USPC ........................................................ 463/21, 20
See application file for complete search history.

(56) References Cited

U.S. PATENT DOCUMENTS

| | | | |
|---|---|---|---|
| 2004/0248648 | A1 | 12/2004 | Rothschild |
| 2005/0176498 | A1 | 8/2005 | Nguyen |
| 2005/0261055 | A1 | 11/2005 | Casey |
| 2007/0129139 | A1 | 6/2007 | Nguyen |
| 2008/0026824 | A1 * | 1/2008 | Muir ........................ G07F 17/32 463/25 |
| 2009/0291745 | A1 | 11/2009 | Shai-Hee |
| 2011/0086698 | A1 | 4/2011 | Liu |
| 2011/0183742 | A1 | 7/2011 | Salmon |
| 2013/0331183 | A1 | 12/2013 | Shai-Hee |
| 2015/0087389 | A1 | 3/2015 | Ratner |
| 2016/0063817 | A1 | 3/2016 | Guinn |

OTHER PUBLICATIONS

Office Action (Notice of Allowance and Fees Due (PTOL-85)) dated Feb. 18, 2022 for U.S. Appl. No. 16/883,261 (pp. 1-5).
Australian Examination Report No. 1 issued in App. No. AU2021282498, dated Feb. 15, 2023, 6 pages.

* cited by examiner

GAMING MACHINE AND METHOD FOR PROGRESSIVE PAY TABLE MODIFICATION OVER A PLURALITY OF GAME ROUNDS TO CONTROL PROBABILITIES FOR WINNING JACKPOTS

RELATED APPLICATIONS

The present application is a continuation application of U.S. patent application Ser. No. 16/883,261, filed May 26, 2020, and entitled "A Method of Operating a Gaming Machine, a Gaming Machine and a Game Controller," which issued on Jun. 14, 2022, as U.S. Pat. No. 11,361,623, which is a continuation application of U.S. patent application Ser. No. 15/870,156, filed Jan. 12, 2018, and entitled "A Method of Operating a Gaming Machine, a Gaming Machine and a Game Controller," which issued on Jun. 2, 2020, as U.S. Pat. No. 10,672,230, which claims priority to Australian Application No. 2017900081, having an International filing date of Jan. 12, 2017, which is hereby incorporated herein by reference in its entirety.

FIELD

The present invention relates to a method of operating a gaming machine, a gaming machine and a game controller.

BACKGROUND

Many gaming machines are configured to occasionally award larger prizes, typically known as jackpot prizes.

A need exists for improved gaming machines which have components that enable such prizes to be awarded in a different manner.

SUMMARY

In a first aspect, the invention provides a gaming machine comprising: memory storing a pay table comprising a plurality of pay table items, each item defining a prize and a required winning combination of symbols to achieve the respective prize; a pay table modifier configured to modify the pay table to apply to at least one game outcome by changing the required winning combination of symbols associated with a first prize such that a lower number of symbols are required to achieve the first prize; an outcome generator configured to generate each at least one game outcome by selecting symbols for display in a plurality of columns of symbol display positions on a display of the gaming machine; and an outcome evaluator configured to evaluate the selected symbols based on the modified pay table upon the pay table being modified.

In an embodiment, the outcome generator is configured to generate a series of game outcomes, and wherein the pay table modifier is configured to modify the pay table for each of the series of game outcomes.

In an embodiment, the pay table modifier is configured to cumulatively modify the pay table for each game outcome of the series of game outcomes.

In an embodiment, the pay table modifier is configured to additionally modify the pay table by at least one of: changing the required winning combination of symbols associated with the first prize such that an even lower number of symbols are required to achieve the first prize; and changing the required winning combination of symbols associated with at least one second prize such that a number of symbols are required to achieve the respective at least one second prize.

In an embodiment, the gaming machine implements a spinning reel game of chance and the gaming machine comprises a reel changer for changing the reels to be employed in the spinning reel game of chance for each of the series of game outcomes.

In an embodiment, the gaming machine comprises a random number generator, and the gaming machine is configured to employ the random number generator to determine a number of game outcomes for the series of game outcomes.

In an embodiment, the number of game outcomes in the series of game outcomes is selected from a range of possible numbers of game outcomes.

In an embodiment, the determination of the number of games is weighted based on a player's wager such that there is a higher probability of a larger number of game outcomes being in the series of game outcomes for relatively higher wagers.

In a second aspect, the invention provides a method of operating a gaming machine comprising: modifying a pay table to apply to at least one game outcome, the pay table stored in a memory of the gaming machine comprising a plurality of pay table items, each item defining a prize and a required winning combination of symbols to achieve the respective prize, the pay table being modified by changing the required winning combination of symbols associated with a first prize such that a lower number of symbols are required to achieve the first prize; generating at least one game outcome by selecting symbols for display in a plurality of columns of symbol display positions on a display of the gaming machine; and evaluating the selected symbols based on the modified pay table upon the pay table being modified.

In a third aspect, the invention provides an electronic game controller for a gaming machine, the game controller configured to: modify a pay table to apply to at least one game outcome, the pay table stored in a memory of the gaming machine comprising a plurality of pay table items, each item defining a prize and a required winning combination of symbols to achieve the respective prize, the pay table being modified by changing the required winning combination of symbols associated with a first prize such that a lower number of symbols are required to achieve the first prize; generate at least one game outcome by selecting symbols for display in a plurality of columns of symbol display positions on a display of the gaming machine; and evaluate the selected symbols based on the modified pay table upon the pay table being modified.

In a fourth aspect, the invention provides a gaming machine comprising the above electronic game controller.

In a fifth aspect, the invention provides computer program code which when executed implements the above method.

In a sixth aspect, the invention provides a tangible computer readable medium comprising the above program code.

BRIEF DESCRIPTION OF THE DRAWINGS

An exemplary embodiment of the invention will now be described with reference to the accompanying drawings in which.

DETAILED DESCRIPTION

Figure 1:
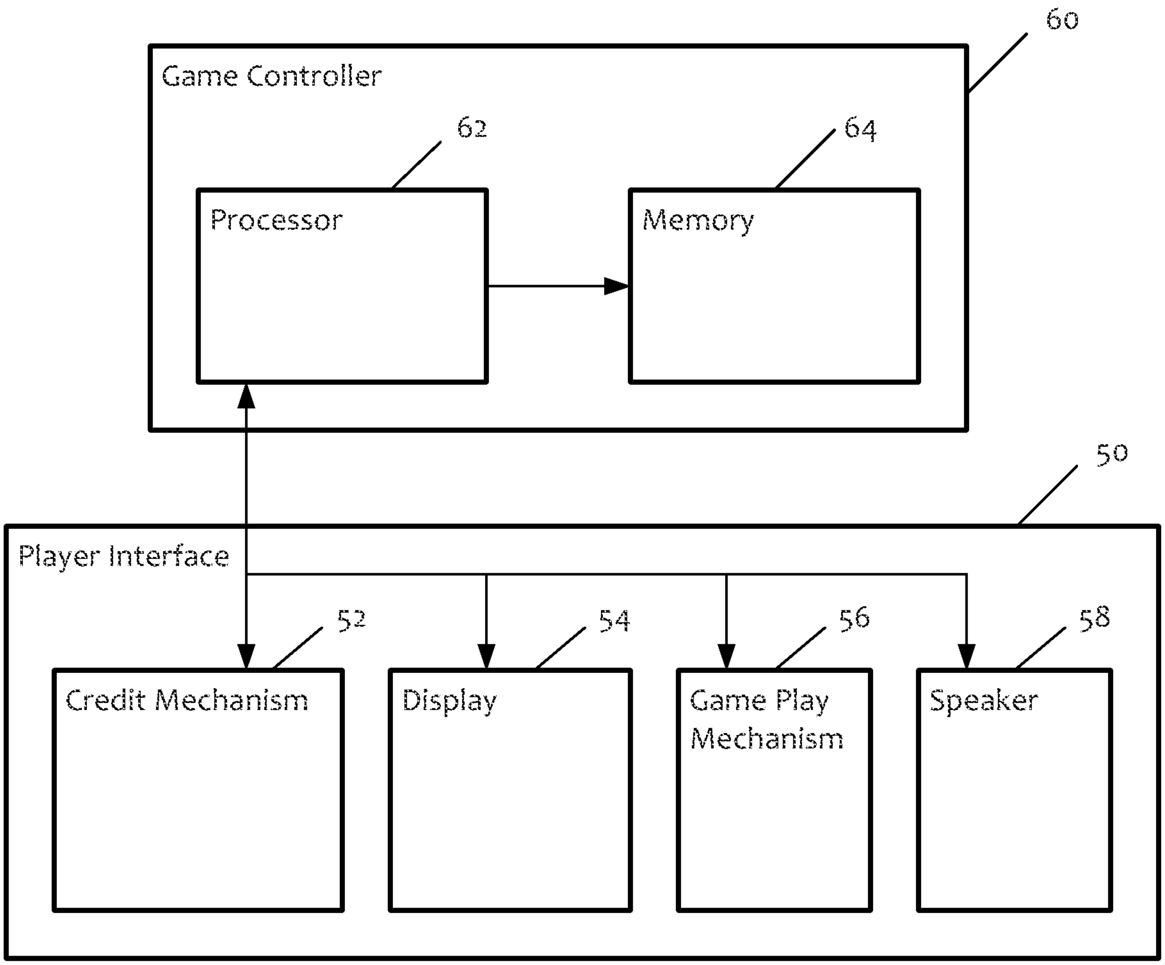
FIG. 1 is a block diagram of the core components of a gaming machine.

Referring to the drawings, there is shown a gaming machine having components that enable the implementation of a game where, in certain circumstances, the symbol combinations required to win at least one prize change for at least one evaluation of a game outcome. In an advantageous embodiment, the gaming machine is arranged so that the symbol combination required to win the prize changes progressively over a series of game outcomes to become more likely to result in a winning outcome. In an embodiment, the number of the series of game outcomes is determined by a random process. Longer series of game outcomes have a greater chance of the prize being won and the chance of the prize being won is higher towards the end of the series of game outcomes.

General Construction of Gaming Machine

The gaming machine can take a number of different forms. In a first form, a stand alone gaming machine is provided wherein all or most components required for implementing the game are present in a player operable gaming machine.

In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming machine has several core components. At the broadest level, the core components are a player interface 50 and a game controller 60 as illustrated in FIG. 1. The player interface is arranged to enable manual interaction between a player and the gaming system and for this purpose includes the input/output components required for the player to enter instructions to play the game and observe the game outcomes.

Components of the player interface may vary from embodiment to embodiment but will typically include a credit mechanism 52 to enable a player to input credits and receive payouts, one or more displays 54, a game play mechanism 56 including one or more input devices that enable a player to input game play instructions (e.g., to place a wager), and one or more speakers 58.

The game controller 60 is in data communication with the player interface and typically includes a processor 62 that processes the game play instructions in accordance with game play rules and outputs game play outcomes to the display. Typically, the game play rules are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server. That is a processor may be provided by any suitable logic circuitry for receiving inputs, processing them in accordance with instructions stored in memory and generating outputs (for example on the display). Such processors are sometimes also referred to as central processing units (CPUs). Most processors are general purpose units, however, it is also know to provide a specific purpose processor using an application specific integrated circuit (ASIC) or a field programmable gate array (FPGA).

Figure 2:
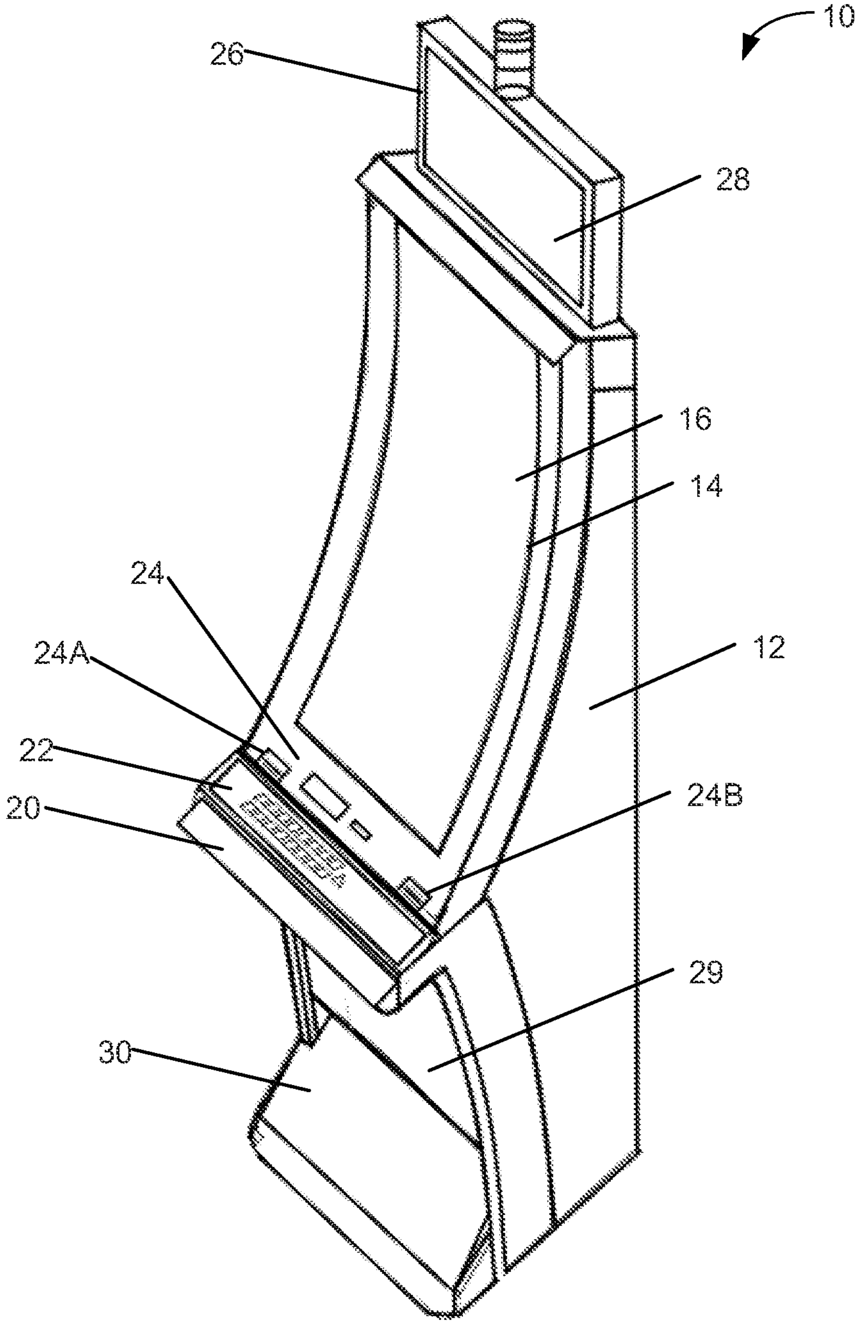
FIG. 2 is a perspective view of a stand alone gaming machine.

A standalone gaming machine 10 is illustrated in FIG. 2. The gaming machine 10 includes a console 12 having a display 14 on which are displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. Other gaming machines may configure for ticket in such that they have a ticket reader for reading tickets having a value and crediting the player based on the face value of the ticker. A player marketing module (not shown) having a reading device may also be provided for the purpose of reading a player tracking device, for example as part of a loyalty program. The player tracking device may be in the form of a card, flash drive or any other portable storage medium capable of being read by the reading device. In some embodiments, the player marketing module may provide an additional credit mechanism, either by transferring credits to the gaming machine from credits stored on the player tracking device or by transferring credits from a player account in data communication with the player marketing module that is accessed in response to insertion of the player tracking device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a liquid crystal display. The display 14 may any other suitable video display unit, such as an OLED display. The top box 26 may also include a display, which may be of the same type as the display 14, or of a different type.

Figure 3:
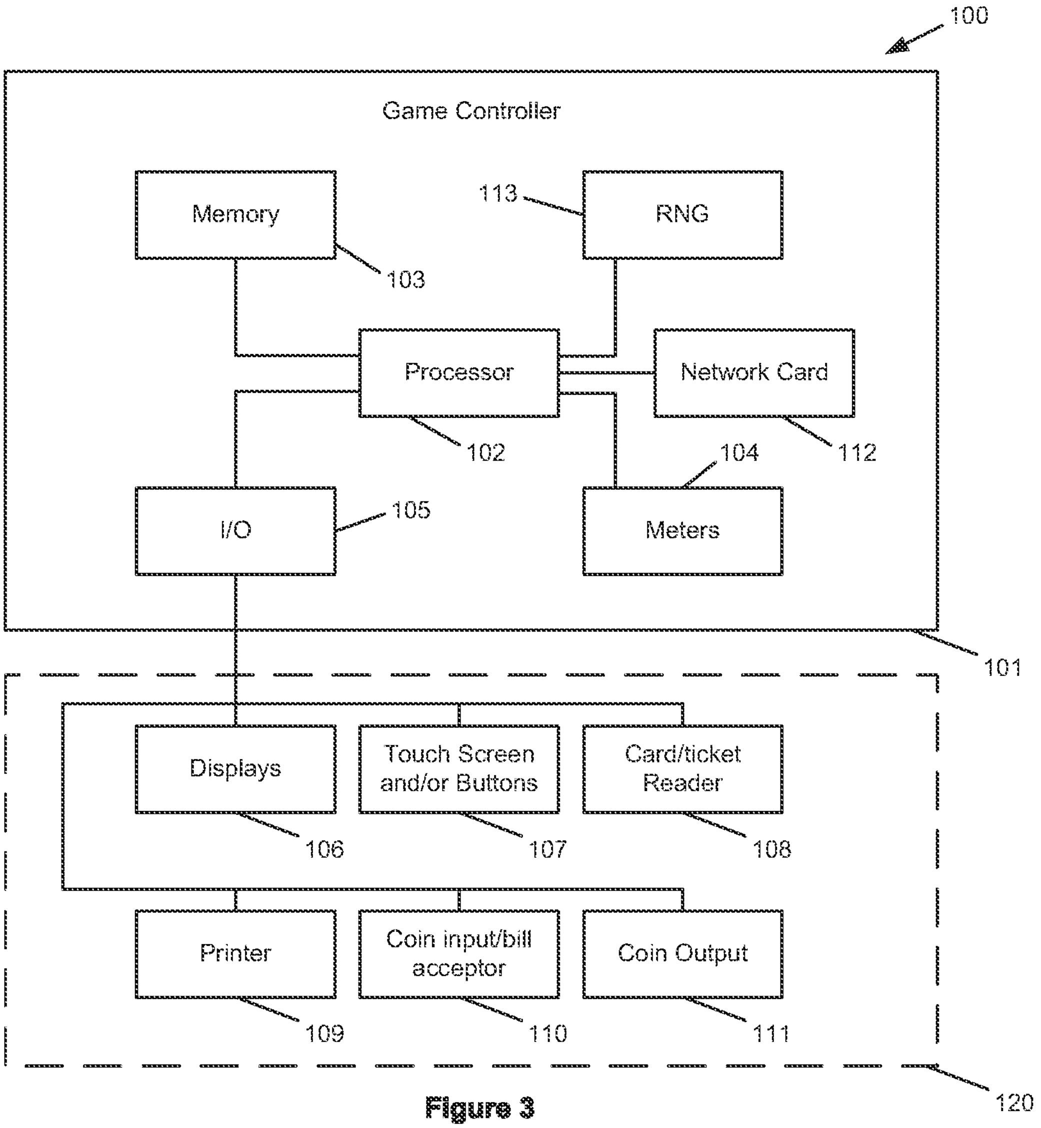
FIG. 3 is a block diagram of the functional components of a gaming machine.

FIG. 3 shows a block diagram of operative components of a typical gaming machine which may be the same as or different to the gaming machine of FIG. 2.

The gaming machine 100 includes a game controller 101 having a processor 102 mounted on a circuit board. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 including one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted as required for the specific implementation. For example, while buttons or touch screens are typically used in gaming machines to allow a player to place a wager and initiate a play of a game any input device that enables the player to input game play instructions may be used. For example, in some gaming machines a mechanical handle is used to initiate a play of the game. Persons skilled in the art will also appreciate that a touch screen can be used to emulate other input devices, for example, a touch screen can display virtual buttons which a player can "press" by touching the screen where they are displayed.

In addition, the gaming machine 100 may include a communications interface, for example a network card 112. The network card may, for example, send status information, accounting information or other information to a bonus controller, central controller, server or database and receive data or commands from the bonus controller, central controller, server or database. In embodiments employing a player marketing module, communications over a network may be via player marketing module—i.e. the player marketing module may be in data communication with one or more of the above devices and communicate with it on behalf of the gaming machine.

Figure 4:
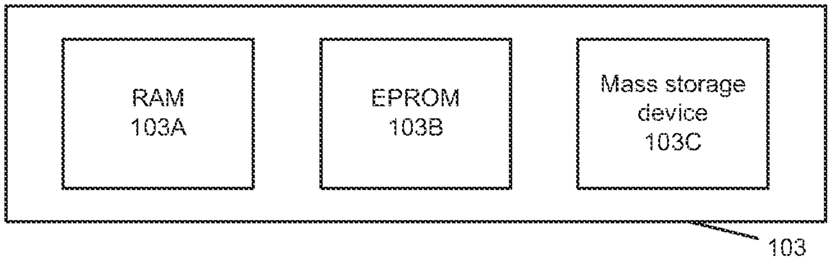
FIG. 4 is a schematic diagram of the functional components of a memory.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

Figure 5:
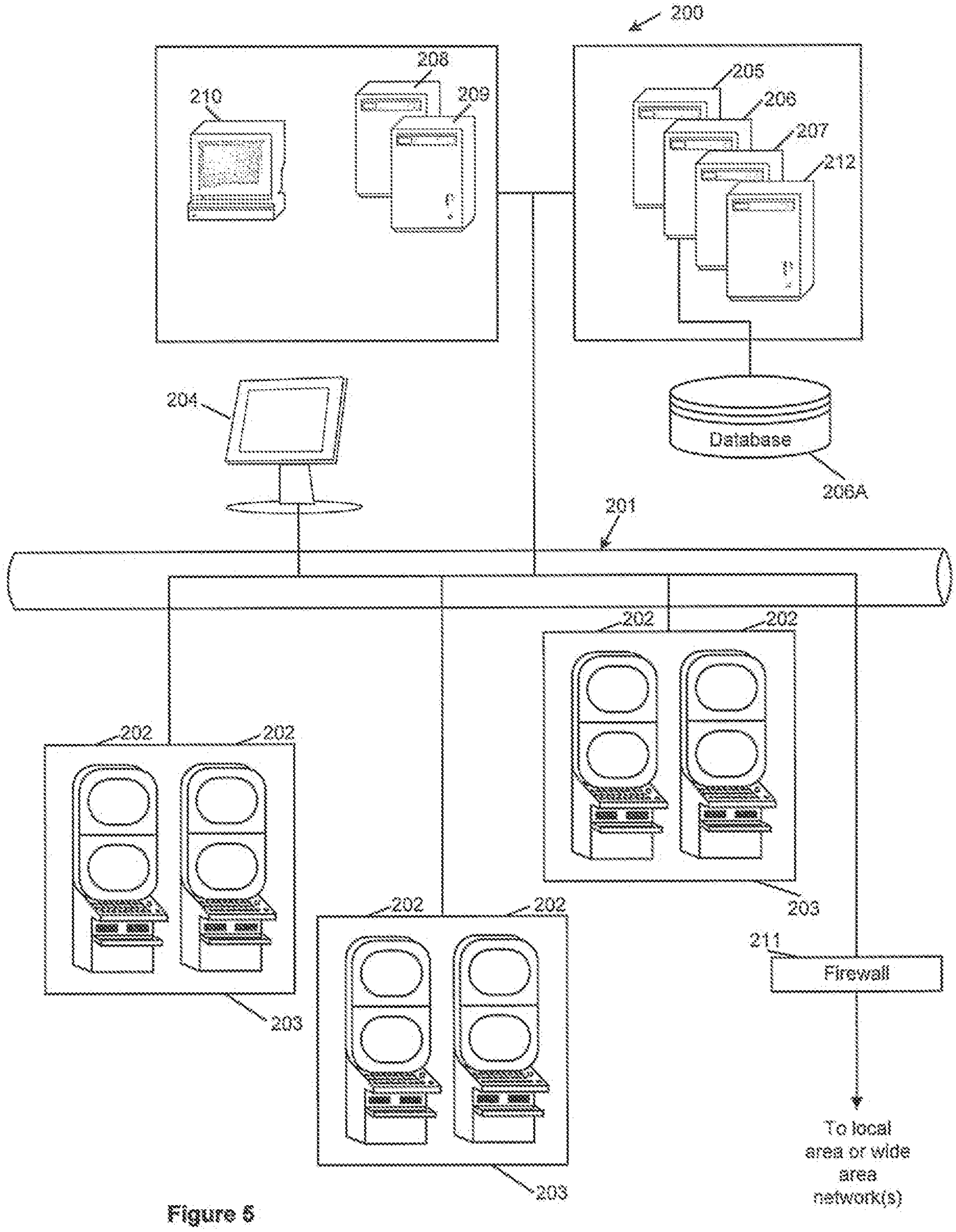
FIG. 5 is a schematic diagram of a network gaming system.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10, 100 shown in FIGS. 2 and 3, or may have simplified functionality depending on the requirements for implementing game play. While banks 203 of two gaming machines are illustrated in FIG. 5, banks of one, three or more gaming machines are also envisaged.

One or more displays 204 may also be connected to the network 201. For example, the displays 204 may be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components. Other client/server configurations are possible, and further details of a client/server architecture can be found in WO 2006/052213 and PCT/SE2006/000559, the disclosures of which are incorporated herein by reference.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming system 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of game servers could be provided to run different games or a single game server may run a plurality of different games as required by the terminals.

Further detail of the gaming machine

The player operates the game play mechanism 56 to specify a wager which will be evaluated for this play of the game and initiates a play of the game. Persons skilled in the art will appreciate that a player's wager can be varied from game to game dependent on player selections. In most spinning reel games, it is typical for the player's wager to be made up of a selection as to how the game outcome will be evaluated by specifying what parts of the game outcome will qualify for winning outcomes and a multiplier that will apply to each winning outcome. For example, a player's wager may be based on how many lines they play in each game—e.g. a minimum of one line up to the maximum number of lines allowed by the game (noting that not all permutations of win lines may be available for selection) and an amount per line—e.g. one, two or five credits. Winning outcomes on an activated win line may be evaluated based on a pay table that specifies the amount awarded for a one credit per line wager multiplied by the amount wagered per line.

Such win lines are typically formed by a combination of symbol display positions, one from each reel, the symbol display positions being located relative to one another such that they form a line.

In many games, the gaming machine may award winning outcomes which are not strictly limited to the lines they have selected, for example, "scatter" pays are awarded independently of a player's selection of pay lines.

Persons skilled in the art, will appreciate that in other embodiments, the player may select a number of reels to play or play a fixed number of reels. Games of this type are marketed under the trade name "Reel Power" by Aristocrat Leisure Industries Pty Ltd and are also known as "ways" to win games. The selection of the reel means that each displayed symbol of the reel can be substituted for a symbol at one or more designated display positions. In other words, all symbols displayed at symbol display positions corresponding to a selected reel can be used to form symbol combinations with symbols displayed at a designated, symbol display positions of the other reels. For example, if there are five reels and three symbol display positions for each reel such that the symbol display positions comprise three rows of five symbol display positions, the symbols displayed in the centre row are used for non-selected reels. As a result, the total number of ways to win is determined by multiplying the number of active display positions of each reel, the active display positions being all display positions of each selected reel and the designated display position of the non-selected reels. As a result for five reels and fifteen display positions there are 243 ways to win.

In one embodiment, the display positions of the symbol display are arranged in a rectangular matrix comprising a plurality of columns and a plurality of rows. However, other arrangements are known in the gaming industry and could be employed in embodiments of the invention. For example, in some arrangements there are more symbols in some columns than others, such as 3-4-3-4-3 arrangement of seventeen display positions corresponding to respective ones of five reels. In such arrangements, the columns of four symbols can be arranged so that they are off-set or staggered relative to the columns having three symbols so that the middle two symbols in the columns of four symbols share boundaries with two symbols of each neighbouring reel.

Figure 6:
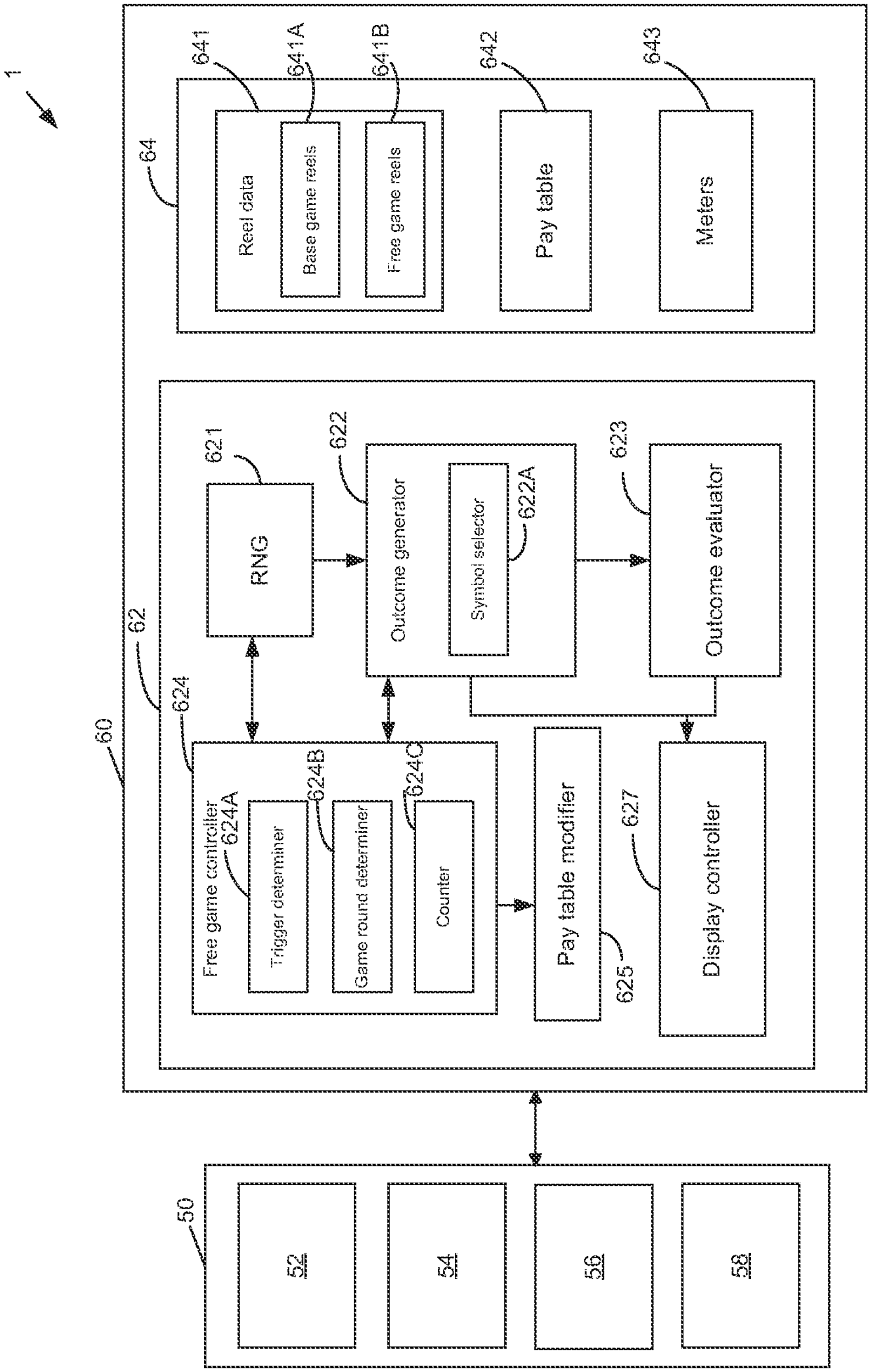
FIG. 6 is a further block diagram of a gaming machine.

In FIG. 6, the processor 62 of game controller 60 of the gaming machine 1 is shown implementing a number of modules based on program code and data stored in memory 64. Persons skilled in the art will appreciate that one or more of the modules could be implemented in some other way, for example by a dedicated circuit.

In the embodiment of FIG. 6, a player places a wager by selecting a number of lines to play and an amount to wager per line. The outcome of a base game is generated by selecting symbols. In this example, by selecting three symbols to display in each of five columns from five reels of symbols corresponding to the respective reels. The symbols are displayed so as to form a matrix of symbol display positions.

In one example, the symbol selector 622A uses random number generator 621 to randomly select a stopping position for each of the five reels.

In an example, the outcome evaluator 623 evaluates the selected symbols to determine whether one or more winning symbol combinations can be found on a bought pay line. That is, a pay line which forms part of the player's selection of pay lines. In an example, the outcome evaluator 623 does this by evaluating the symbols from left to right relative to the defined pay lines.

The pay table 642 defines the winning combinations of symbols associated with respective prizes. For example, some prizes may require a player to have five of the same symbol, others may require 4 of the same symbol, others may require three of the same symbol and others may require two of the same symbol to appear on a winning pay line. The pay table 642 may also define scatter wins which are awarded for a defined number of symbols independently of the position at which the symbols appear.

In an example embodiment, the pay table 642 includes three jackpot prizes which, in the base game, will be awarded by the outcome evaluator 623 if the outcome generator generates five of the specific jackpot symbols associated with the specific jackpot prizes on a bought pay line. For example, the pay table 642 may define an award for five grand jackpot symbols, five major jackpot symbols, and five minor jackpot symbols. Depending on the embodiment, value of the jackpot prizes may either be fixed or may vary. For example, one or more jackpot prizes may be a progressive prize that is altered based on turnover of the gaming machine. It will be appreciated that in order for such prizes to be awarded, each of the reels must include at least one jackpot prize symbol.

The symbols of the base game reels 641A specified by reel data 641 may include a WILD or a substitute symbol that substitutes for other symbols in some or all winning combinations. For example, in an embodiment, a WILD symbol cannot substitute in a jackpot prize.

In an embodiment, as shown in FIG. 6, the gaming machine includes a free game controller 624 having a trigger determiner 624A which determines for every play of the game whether to award a series of free games using a value obtained from random number generator 621. In an example, the odds of a series of free games being triggered by the trigger determiner 624A are dependent on the amount wagered. For example, the odds set out in Table 1 can apply.

TABLE 1

| |
|---|
| 1 in 80 on bet 1 per line |
| 1 in 50 on bet 2 per line |
| 1 in 40 on bet 3 per line |
| 1 in 33 on bet 5 per line |
| 1 in 25 on bet 10 per line |
| 1 in 25 on bet 20 per line |

In an example as shown in FIG. 6, the free game controller 624 also has a game round determiner 624B that randomly determines a number of game rounds to be conducted if the free games are awarded. That is, game round determiner 624B uses random number generator 624 to select a number of game rounds that will be conducted. In each game round a game outcome by selecting symbols from free game reels 641B. In an example, the number of free games conducted is randomly selected from the range of 3 to 10 free games or "spins".

In an example, the number of spins awarded is weighted based on the bet per line such that different average numbers of spins will result from different wagers as set out in Table 2.

TABLE 2

| |
|---|
| Average of 3.88 spins on bet 1 per line |
| Average of 4.10 spins on bet 2 per line |
| Average of 4.23 spins on bet 3 per line |
| Average of 4.52 spins on bet 5 per line |
| Average of 4.66 spins on bet 10 per line |
| Average of 5.57 spins on bet 20 per line |

In an example, once the number of game rounds is set, this is set as the initial value of counter 624C and the free game controller 624 causes the outcome generator 622 to repeatedly generate game outcomes until the counter reaches "0".

In an embodiment, the pay table modifier 627 is arranged to modify the pay table 642 before each spin of the series of spins.

In an embodiment, the modifications are cumulative such that the modifications to the pay table 642 increase with the number of spins.

In one example, there are four winning combinations that can be modified depending on the number of spins awarded. In an embodiment, the number of symbols required to win the respective prizes is progressively modified by the pay table modifier 627 as set out in Table 3.

TABLE 3

| SS Reel Set: | Required J1 trigger: | Required J2 trigger: | Required J3 trigger: | Required J4 trigger: |
|---|---|---|---|---|
| 1 | 4 | 5 | 5 | 5 |
| 2 | 4 | 4 | 5 | 5 |
| 3 | 4 | 4 | 4 | 5 |
| 4 | 4 | 4 | 4 | 4 |
| 5 | 3 | 4 | 4 | 4 |
| 6 | 3 | 3 | 4 | 4 |
| 7 | 3 | 3 | 3 | 4 |
| 8 | 3 | 3 | 3 | 3 |
| 9 | 3 | 3 | 3 | 2 |
| 10 | 3 | 3 | 2 | 2 |

As indicated above, between 3 and 10 game rounds can be awarded and all the prizes are available in the base game. During the series of spins, free game reels 641B are used. In an example, the outcome evaluator 623 only awards prizes for jackpot symbols. In an embodiment, in order to control the probability of jackpot prizes being awarded different reel sets of free game reels 641B are used for each free spin.

As can be seen in the first round, the first jackpot (J1) combination has been reduced from a required 5 symbols to 4 symbols while the number of symbols required of the other three jackpots remains the same. Progressively, a further symbol is removed from the number of symbols required to have a winning combination in each of the game rounds in the manner defined by Table 1. Initially the symbols are removed in the sequence of the first jackpot, the second jackpot, the third jackpot and the fourth jackpot before reverting to the first jackpot such that a further symbol is removed from that jackpot in the fifth game round. In the ninth round, rather than an additional symbol being removed from the first jackpot it is removed by the pay table modifier 627 from the fourth jackpot and then in the last round, from the third jackpot. In this example, the first jackpot is the highest prize and the fourth jackpot is the lowest prize.

In this way, the odds of a player winning a prize are increased dependent on the number of free spins that are awarded. Further, it is also more likely that should an award be made, it will be made in a later one of the game outcomes.

In another embodiment, the game may have another feature game that involves conducting a number of free normal games using the base game reels 641A or a further set of reel. In one example of such an embodiment, the free game controller 624 is configured to determine whether to award a series of the jackpot free spins within each of those free games.

Figure 7:
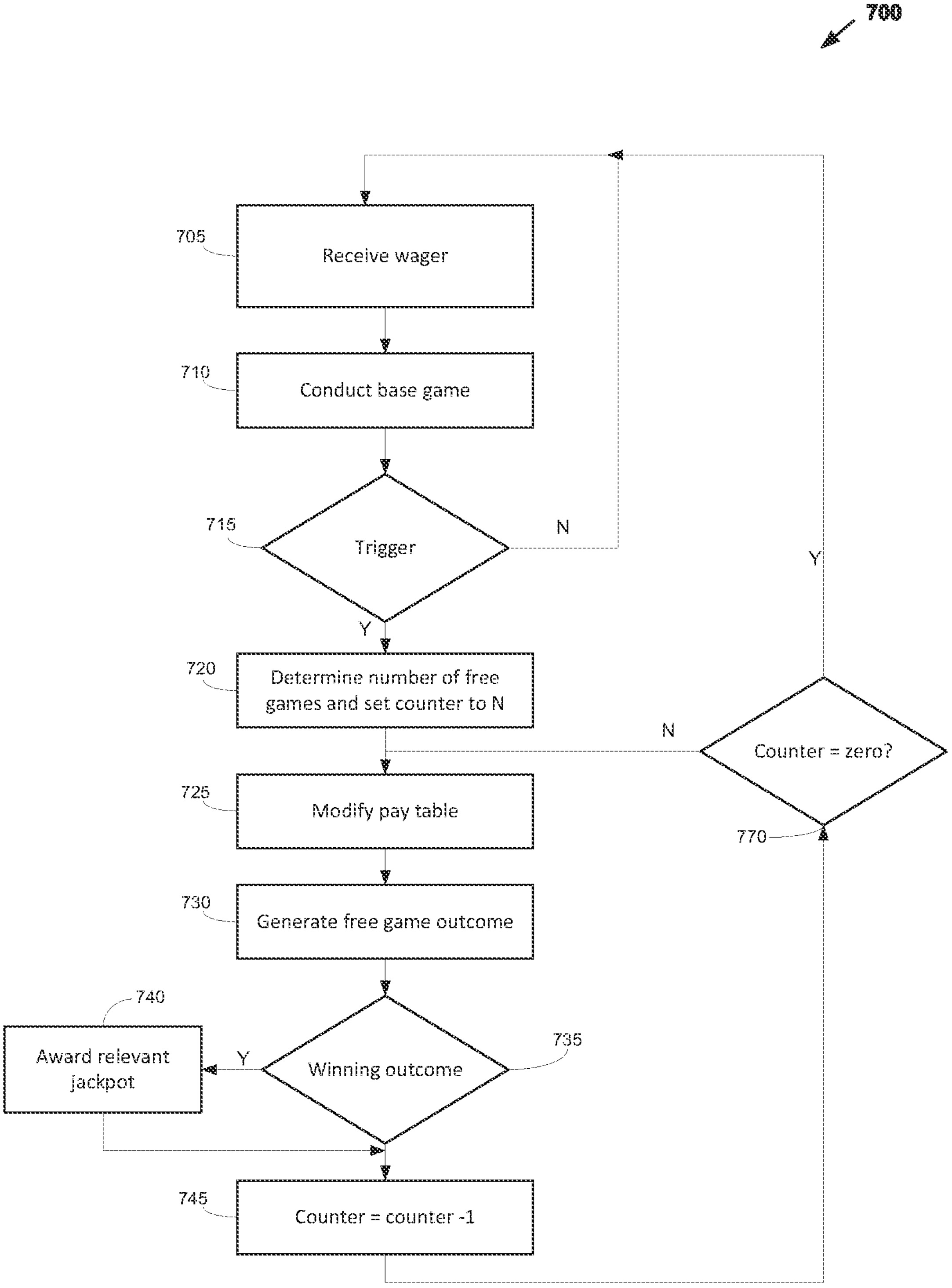
FIG. 7 is a flow chart of an embodiment.

Turning to FIG. 7, there is shown a flowchart 700 of a method of operating a gaming machine of the embodiment. In an embodiment, the gaming machine is in a waiting state until it receives a wager 705. The gaming machine then conducts a base game and determines 715 whether to trigger the award of a series of free spins. If it does not trigger, it returns to a waiting state. If it does trigger 715, the gaming machine determines a number of free spins (N) and sets a counter to (N) 720. The pay table modifier 725 modifies the pay table 642 to apply to the first game outcome of the free spins. The method then involves generating a free game outcome 730. If the free game outcome is evaluated by the outcome evaluator 623 as including a winning outcome, then the gaming machine awards the relevant prize from the pay table. In this example, the relevant jackpot prize. The counter is then reduced 745 by 1. The gaming machine determines 770 whether the counter has reached "0" and if it has not, a further modification is made to the pay table 725 before a further free game outcome is generated. The method 700 involves repeating the relevant steps until the counter equals "0", at which time the game concludes.

Figure 8A:
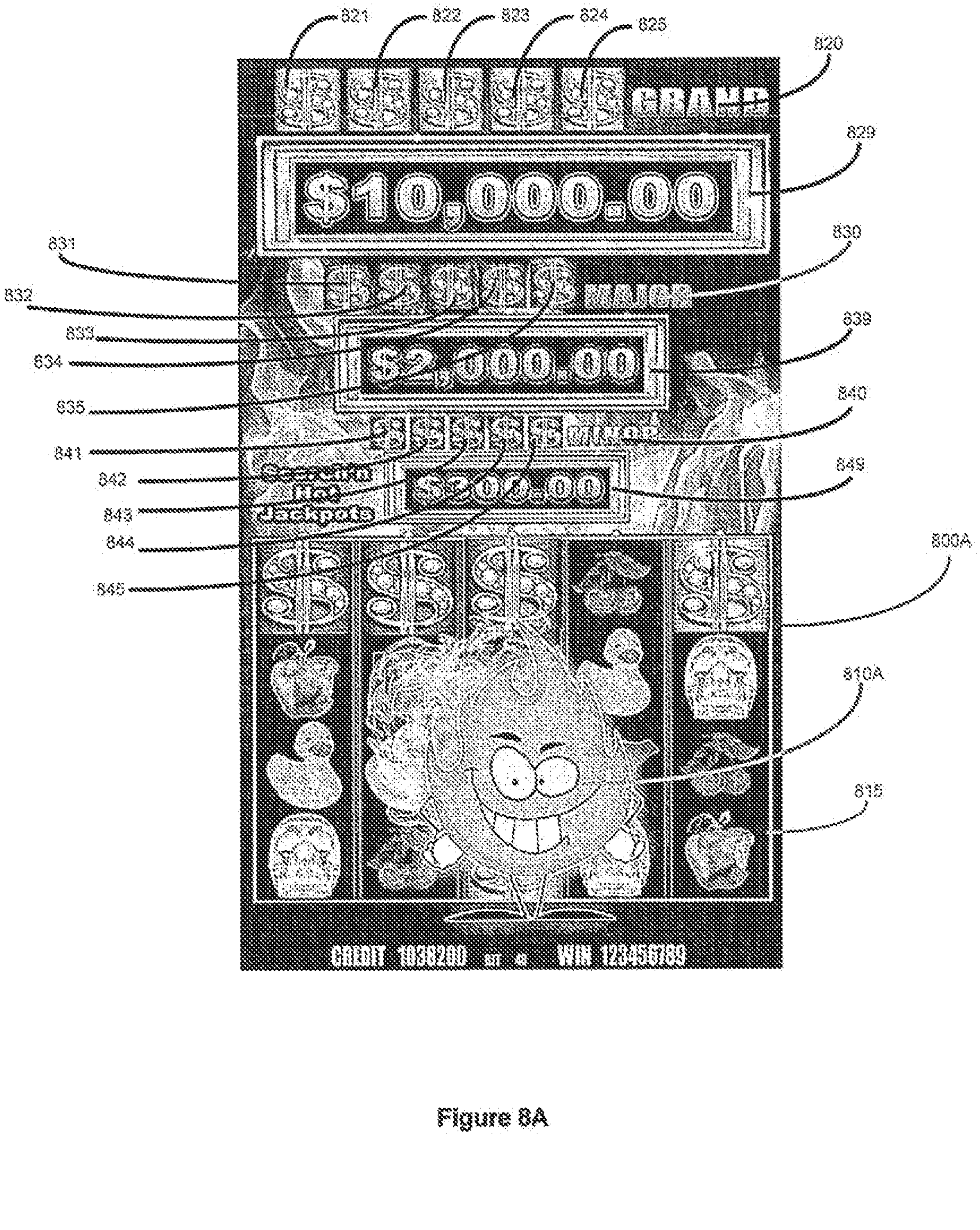
FIGS. 8A to 8C are exemplary screen shots showing how the modified pay table can be applied in a scenario where the prizes for which the winning symbol combinations are modified are jackpot prizes.
Figure 8B:
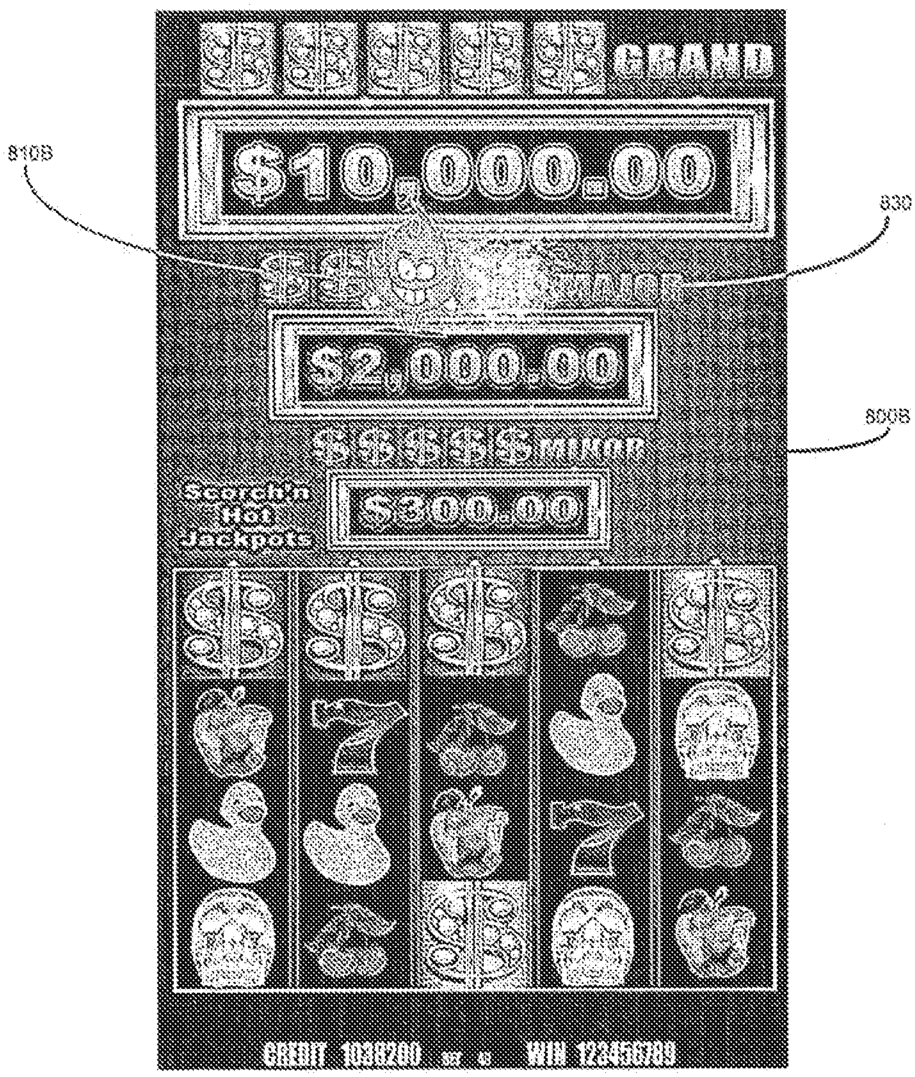
Figure 8C:
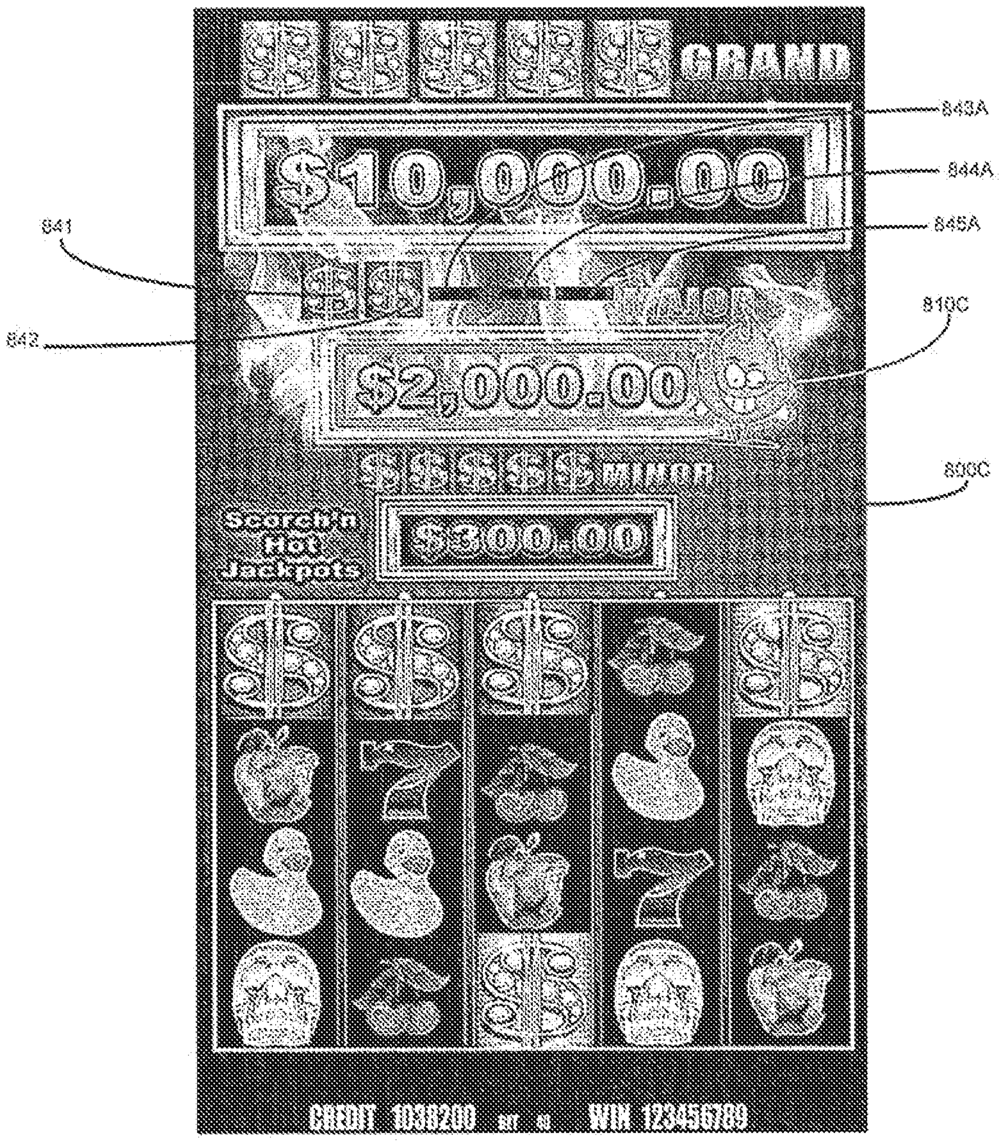

Referring to FIGS. 8A-8C there is shown a series of screen shots 800A, 800B and 800C of an example of how the application of modifications to the pay table can be effectively communicated to the player such that the player can quickly understand the current state of game play. A flame character 810A appears on the display over the reels when a trigger condition is satisfied. The gaming machine displays a grand prize 820 and five dollar symbols 821-825 which indicate the number of symbols currently required to win the grand jackpot 820. The amount of the award of the grand jackpot is shown in box 829. Similarly, for major prize 830, dollar symbols 831-835 indicate the number of symbols required to win the major jackpot prize 839. Again, dollar symbols 841-845 indicate the number of symbols required to win the minor jackpot prize 840 which has a display value 849 of $300.

When the flame symbol 810A appears this communicates to the player that a trigger condition has been met and that the number of symbols required to win one of the prizes is going to be adjusted by the pay table modifier 627 for at least one game outcome. As is shown in FIG. 8B, the flame symbol moves on the display to position 810B where it overlays the dollar symbols of major jackpot prize 830. The flame symbol is animated as burning away some of the dollar symbols. The resultant outcome is shown in FIG. 8C where only dollar symbols 841 and 842 remain and blank spaces 843A, 844A, 845A are shown where the dollar symbols 843, 844, 845 were previously displayed. The flame character 810C is placed next to the prize for the major jackpot to further indicate to the player that this prize has been modified.

Accordingly, it will be apparent that in the example of FIG. 8, three symbols are removed at once. Thus it will be appreciated that a number of different modifications can be applied to the symbol combinations required to win prizes.

Typically, a winning outcome will result in some form of award being made such as an award of credits. Such an award may never actually be physically received by a player. For example, many gaming systems provide a player with a double or nothing gamble feature, where the player can double or forfeit their credits before commencing another play of the game or cashing out. Further, as credits are fungible, once credits have been added to the credit meter it is not possible to distinguish between credits which exist because the player has input cash or the like and credits resulting from an award.

Further aspects of the method of operating a gaming machine will be apparent from the above description of the gaming machine. It will be appreciated that at least part of the method will be implemented electronically, for example, digitally by a processor executing program code such as in the above description of a game controller. In this respect, in the above description certain steps are described as being carried out by a processor m, it will be appreciated that such steps will often require a number of sub-steps to be carried out for the steps to be implemented electronically, for example due to hardware or programming limitations. For example, to carry out a step such as evaluating, determining or selecting, a processor may need to compute several values and compare those values.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

It will be understood to persons skilled in the art of the invention that many modifications may be made without departing from the spirit and scope of the invention, in particular it will be apparent that certain features of embodiments of the invention can be employed to form further embodiments.

It is to be understood that, if any prior art is referred to herein, such reference does not constitute an admission that the prior art forms a part of the common general knowledge in the art in any country.

In the claims which follow and in the preceding description of the invention, except where the context requires otherwise due to express language or necessary implication, the word “comprise” or variations such as “comprises” or “comprising” is used in an inclusive sense, i.e. to specify the presence of the stated features but not to preclude the presence or addition of further features in various embodiments of the invention.

What is claimed is:

1. A gaming system comprising:

a server, operable to be coupled to a plurality of devices via a network, having a processor and a memory storing a) a pay table specifying a plurality of numbers of winning symbols required to win a plurality of jackpots, respectively, the plurality of numbers of winning symbols including a first number of winning symbols required to win a first jackpot of the plurality of jackpots, representing a first odd to win the first jackpot, and b) instructions, which, when executed, cause the processor to at least:

set a plurality of game rounds to be awarded based on one or more random events generated via a random number generator, communicate with a first device, when coupled via the network, the plurality of game rounds to be awarded, communicate with the first device the plurality of numbers of winning symbols required to win the plurality of jackpots, respectively, communicate with the first device to progressively animate, for each of the plurality of game rounds, a) a character overlaying a subset of the first number of winning symbols based on the random events generated, and b) the character removing the subset of the first number of winning symbols to reduce the first number of winning symbols required to win the first jackpot of the plurality of jackpots, thus increasing the first odd to win the first jackpot, communicate with the first device to present a plurality of game symbols selected based on the random events generated, and communicate with the first device to present the first jackpot in response the plurality of game symbols selected include the subset of the first number of winning symbols.

2. The gaming system of claim 1, wherein the instructions, when executed, further cause the processor to generate a series of game outcomes based on the random events, and modify the pay table for each of the series of game outcomes.

3. The gaming system of claim 2, wherein the instructions, when executed, further cause the processor to cumulatively modify the pay table for each game outcome of the series of game outcomes.

4. The gaming system of claim 3, wherein the instructions, when executed, further cause the processor to cumulatively and progressively modify the pay table to change a required winning combination of winning symbols associated with one of a) the first jackpot such that an even lower number of winning symbols is required to achieve the first jackpot, and b) a second jackpot such that a reduced number of winning symbols are required to achieve the second jackpot.

5. The gaming system of claim 1, wherein the instructions, when executed, further cause the processor to progressively reduce the plurality of numbers of winning symbols required to win the plurality of jackpots in a predetermined sequence.

6. The gaming system of claim 5, wherein the predetermined sequence includes an order of the plurality of jackpots in one or more initial game rounds, and an reverse order of the plurality of jackpots in one or more subsequent game rounds.

7. The gaming system of claim 1, wherein the instructions, when executed, further cause the processor to animate the subset being removed.

8. A method for providing a plurality of game rounds in a gaming system including a server, operable to be coupled to a plurality of devices via a network, the server having a processor and a memory storing a) a pay table specifying a plurality of numbers of winning symbols required to win a plurality of jackpots, respectively, the plurality of numbers of winning symbols including a first number of winning symbols required to win a first jackpot of the plurality of jackpots, representing a first odd to win the first jackpot, and b) instructions, which, when executed, cause the processor to initiate a game, the method comprising:

communicating if a first device of the plurality of devices has been coupled to the server over the network;

communicating with the first device, when coupled to the network, the plurality of game rounds to be awarded determined based on one or more random events generated via a random number generator, and the plurality of numbers of winning symbols required to win the plurality of jackpots, respectively;

communicating with the first device to progressively animate, for each of the plurality of game rounds, a) a character overlaying a subset of the first number of winning symbols based on the random events generated, and b) the character removing the subset of the first number of winning symbols to reduce the first number of winning symbols required to win the first jackpot of the plurality of jackpots, thus increasing the first odd to win the first jackpot;

communicating with the first device to animate a plurality of game symbols selected based on the random events generated; and communicating with the first device to animate the first jackpot in response the plurality of game symbols selected include the subset of the first number of winning symbols.

9. The method of claim 8, further comprising generating a series of game outcomes based on the random events, and modify the pay table for each of the series of game outcomes.

10. The method of claim 9, further comprising cumulatively modifying the pay table for each game outcome of the series of game outcomes.

11. The method of claim 10, further comprising cumulatively and progressively modifying the pay table to change a required winning combination of winning symbols associated with one of a) the first jackpot such that an even lower number of winning symbols is required to achieve the first jackpot, and b) a second jackpot such that a reduced number of winning symbols are required to achieve the second jackpot.

12. The method of claim 8, further comprising progressively reducing the plurality of numbers of winning symbols required to win the plurality of jackpots in a predetermined sequence.

13. The method of claim 12, wherein the predetermined sequence includes an order of the plurality of jackpots in one or more initial game rounds, and an reverse order of the plurality of jackpots in one or more subsequent game rounds.

14. A non-transitory computer-readable medium for conducting a game in a gaming system including a server, operable to be coupled to a plurality of devices via a network, the server having a processor and a memory storing a) a pay table specifying a plurality of numbers of winning symbols required to win a plurality of jackpots, respectively, the plurality of numbers of winning symbols including a first number of winning symbols required to win a first jackpot of the plurality of jackpots, representing a first odd to win the first jackpot, and b) instructions, which, when executed cause the processor to perform at least the steps of:

awarding a plurality of game rounds based on one or more random events generated via a random number generator;

monitoring if a first device of the plurality of devices is coupled to the server over the network;

communicating with the first device, when coupled to the server over the network, the plurality of game rounds awarded, and the plurality of numbers of winning symbols required to win the plurality of jackpots, respectively;

communicating with the first device to progressively animate, for each of the plurality of game rounds, a) a character overlaying a subset of the first number of winning symbols based on the random events generated, and b) the character removing the subset of the first number of winning symbols to reduce the first number of winning symbols required to win the first jackpot of the plurality of jackpots, thus increasing the first odd to win the first jackpot;

providing a first animation for the first device to present a plurality of game symbols selected based on the random events generated; and providing a second animation for the first device to present the first jackpot in response the plurality of game symbols selected include the subset of the first number of winning symbols.

15. The non-transitory computer-readable medium of claim 14, wherein the instructions, when executed, further cause the processor to perform the step of generating a series of game outcomes based on the random events, and modify the pay table for each of the series of game outcomes.

16. The non-transitory computer-readable medium of claim 15, wherein the instructions, when executed, further cause the processor to perform the step of cumulatively modifying the pay table for each game outcome of the series of game outcomes.

17. The non-transitory computer-readable medium of claim 16, wherein the instructions, when executed, further cause the processor to perform the step of cumulatively and progressively modifying the pay table to change a required winning combination of winning symbols associated with one of a) the first jackpot such that an even lower number of winning symbols is required to achieve the first jackpot, and b) a second jackpot such that a reduced number of winning symbols are required to achieve the second jackpot.

18. The non-transitory computer-readable medium of claim 14, wherein the instructions, when executed, further cause the processor to perform the step of progressively reducing the plurality of numbers of winning symbols required to win the plurality of jackpots in a predetermined sequence.

19. The non-transitory computer-readable medium of claim 18, wherein the predetermined sequence includes an order of the plurality of jackpots in one or more initial game rounds, and an reverse order of the plurality of jackpots in one or more subsequent game rounds.

20. The non-transitory computer-readable medium of claim 14, wherein the instructions, when executed, further cause the processor to perform the step of causing an animation of the subset being removed.

* * * * *